(12) United States Patent
Kuriyama (10) Patent No.: US 11,821,639 B2
(45) Date of Patent: Nov. 21, 2023

(54) DEVICE FOR MONITORING STATE OF APPARATUS AND METHOD FOR MONITORING STATE OF APPARATUS

(71) Applicant: Mitsubishi Electric Corporation, Tokyo (JP)

(72) Inventor: Toshiyuki Kuriyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 115 days.

(21) Appl. No.: 17/547,820

(22) Filed: Dec. 10, 2021

(65) Prior Publication Data
US 2022/0099323 A1   Mar. 31, 2022

Related U.S. Application Data (63) Continuation of application No. PCT/JP2019/029199, filed on Jul. 25, 2019.

(51) Int. Cl.
| | |
|---|---|
| G06F 11/30 | (2006.01) |
| F24F 11/30 | (2018.01) |
| G01M 99/00 | (2011.01) |
| G06F 11/34 | (2006.01) |
| G06F 17/18 | (2006.01) |

(52) U.S. Cl.
CPC .......... F24F 11/30 (2018.01); G01M 99/005 (2013.01); G06F 11/3495 (2013.01); G06F 17/18 (2013.01)

(58) Field of Classification Search
CPC ...................................... F24F 11/30
See application file for complete search history.

(56) References Cited

U.S. PATENT DOCUMENTS

| | | | |
|---|---|---|---|
| 2001/0005821 A1* | 6/2001 | Ottosson | ................. G07C 3/00 |
| | | | 702/182 |
| 2007/0100623 A1* | 5/2007 | Hentschel | .......... G01N 29/4472 |
| | | | 704/256.8 |

FOREIGN PATENT DOCUMENTS

| | | |
|---|---|---|
| DE | 699 10 800 T2 | 6/2004 |
| DE | 10 2004 023 824 A1 | 12/2005 |
| EP | 0 775 335 B1 | 8/1998 |
| JP | 2001-166819 A | 6/2001 |
| JP | 2009-116420 A | 5/2009 |
| JP | 2015-92121 A | 5/2015 |

OTHER PUBLICATIONS

International Search Report (PCT/ISA/210) issued in PCT/JP2019/029199, dated Sep. 3, 2019.
Written Opinion of the International Searching Authority (PCT/ISA/237) issued in PCT/JP2019/029199, dated Sep. 3, 2019.
German Office Action for German Application No. 11 2019 007 470.9 dated Nov. 3, 2022, with English Translation.

* cited by examiner

*Primary Examiner* — Phuong Huynh
(74) *Attorney, Agent, or Firm* — Birch, Stewart, Kolasch & Birch, LLP (57) ABSTRACT

A device for monitoring state of apparatus projects a plurality of pieces of measured data to a dimensionless space in which a plurality of display shapes of a plurality of pieces of normal information are represented by a common shape on the basis of a positional relationship between the plurality of display shapes of the plurality of pieces of normal information and the plurality of pieces of measured data, and estimates a distribution of the state of the apparatus on the basis of the plurality of pieces of measured data projected to the dimensionless space.

5 Claims, 8 Drawing Sheets

DEVICE FOR MONITORING STATE OF APPARATUS AND METHOD FOR MONITORING STATE OF APPARATUS

CROSS REFERENCE TO RELATED APPLICATION

This application is a Continuation of PCT International Application No. PCT/JP2019/029199, filed on Jul. 25, 2019, which is hereby expressly incorporated by reference into the present application.

TECHNICAL FIELD

The present invention relates to a device for monitoring state of apparatus and a method for monitoring state of apparatus, each of which monitors a state of an apparatus.

BACKGROUND ART

As a conventional technique for monitoring state of apparatus, for example, there is a method for determining a maintenance timing of a vehicle air conditioner described in Patent Literature 1. In this method, a difference between a specific enthalpy at the start of compression and a specific enthalpy at the end of compression by an outdoor heat exchanger is compared with each of a first set value and a second set value larger than the first set value. At this time, when the difference in the specific enthalpy is larger than the second set value, the air conditioner is determined to require maintenance.

On the other hand, when the difference in the specific enthalpy is larger than the first set value and smaller than the second set value, a refrigeration cycle figure of a Mollier diagram (hereinafter, described as a p-h (pressure-specific enthalpy) diagram) is created on the basis of sensor data detected by various sensors provided in the outdoor heat exchanger. The refrigeration cycle figure is displayed together with a refrigeration cycle figure when the air conditioner is in a normal state.

In the p-h diagram, when the shape of the refrigeration cycle figure has changed from that corresponding to the normal state, it can be determined that the performance of the air conditioner has deteriorated. When the difference in shape exceeds the set value, it is determined that the air conditioner requires maintenance. Note that the refrigeration cycle figure in the normal state of the air conditioner is a display shape of normal information indicating the normal state of the apparatus, and the sensor data used to create the refrigeration cycle figure is measured data of the state value of the apparatus.

CITATION LIST

Patent Literature

Patent Literature 1: JP 2015-92121A

SUMMARY OF INVENTION

Technical Problem

The shape of the refrigeration cycle figure of the p-h diagram of the air conditioner varies depending on the outside air temperature even when the set temperature of the air conditioner is the same. That is, the refrigeration cycle figure in the normal state of the air conditioner has a different shape depending on the outside air temperature. The refrigeration cycle figure to be compared with the refrigeration cycle figure in the normal state of the air conditioner is so-called instantaneous data created on the basis of the sensor data detected at the start of the maintenance timing determination.

The method described in Patent Literature 1 monitors whether or not a state of an apparatus indicated by instantaneous data is a normal state to determine necessity of maintenance of the apparatus. Therefore, when an outlier incidentally occurs in the instantaneous data, there is a possibility that the state of the apparatus is erroneously recognized.

On the other hand, by specifying a change tendency of the state of the apparatus to be monitored on the basis of a plurality of pieces of sensor data sequentially detected within a certain period (for example, for one month), it is possible to reduce the influence of an outlier incidentally occurred in the sensor data. However, if the external environment (for example, outside air temperature) or the use method of the apparatus changes within this period and the display shape of the normal information changes, the correspondence relationship between the plurality of pieces of sensor data and the plurality of pieces of normal information is difficult to see, and there is a problem that the plurality of states of the apparatus cannot be accurately recognized.

The present invention solves the above problems, and an object thereof is to obtain a device for monitoring state of apparatus and a method for monitoring state of apparatus capable of recognizing a plurality of states of an apparatus on the basis of a common display shape.

Solution to Problem

A device for monitoring state of apparatus according to the present invention includes: processing circuitry to acquire measured data of a state value of an apparatus; to acquire normal information indicating a normal state of the apparatus; to acquire a positional relationship of the measured data in a display shape of the normal information; to project a plurality of pieces of the measured data to a dimensionless space in which a plurality of display shapes of a plurality of pieces of the normal information are represented by a common shape on a basis of a positional relationship between a plurality of display shapes of a plurality of pieces of the normal information and a plurality of pieces of the measured data; and to estimate a distribution of the state of the apparatus on a basis of a plurality of pieces of the measured data projected to the dimensionless space.

Advangageous Effects of Invention

According to the present invention, a plurality of pieces of measured data of a state value of an apparatus are projected to a dimensionless space in which a plurality of display shapes of a plurality of pieces of normal information indicating a normal state of the apparatus is represented by a common shape, and a distribution of the states of the apparatus is estimated on the basis of the plurality of pieces of measured data projected to the dimensionless space. As a result, a plurality of states of the apparatus can be recognized on the basis of the common display shape.

DESCRIPTION OF EMBODIMENTS

First Embodiment

Figure 1:
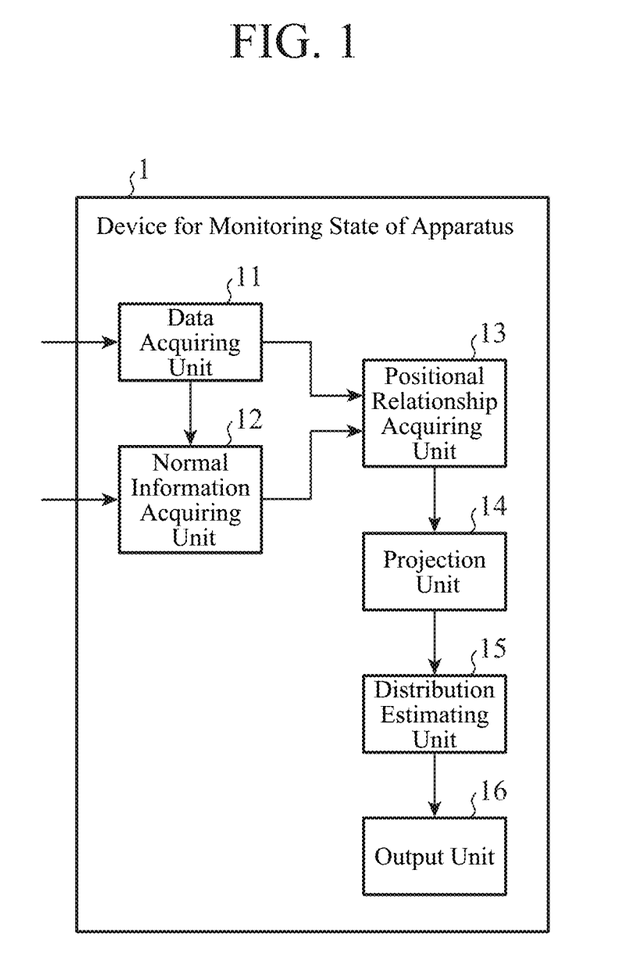
FIG. 1 is a block diagram showing a configuration of a device for monitoring state of apparatus according to a first embodiment.

FIG. 1 is a block diagram showing a configuration of a device 1 for monitoring state of apparatus according to the first embodiment. The device 1 for monitoring state of apparatus is a device that monitors a state of an apparatus on the basis of a result of comparing measured data of a state value of the apparatus to be monitored with a display shape of normal information indicating a normal state of the apparatus. As illustrated in FIG. 1, the device 1 for monitoring state of apparatus includes a data acquiring unit 11, a normal information acquiring unit 12, a positional relationship acquiring unit 13, a projection unit 14, a distribution estimating unit 15, and an output unit 16. The apparatus whose state is to be monitored by the device 1 for monitoring state of apparatus is preferably an apparatus in which various sensors for detecting various states of the apparatus are installed, and is, for example, an air conditioner.

The data acquiring unit 11 acquires measured data of the state value of the apparatus to be monitored. The data acquiring unit 11 acquires measured data for a constant period (for example, one month) for monitoring the state of the apparatus. The measured data is, for example, sensor data detected by various sensors provided in the apparatus. When the apparatus to be monitored is an air conditioner, the sensors are, for example, pressure sensors and temperature sensors installed at various locations of the air conditioner. The normal information is present for each state of the apparatus indicated by the sensor data.

The normal information acquiring unit 12 acquires normal information. For example, when the apparatus to be monitored is an air conditioner, the normal information is a refrigeration cycle of the p-h diagram in the normal state of the air conditioner, and the display shape of the normal information is a refrigeration cycle figure. Note that the refrigeration cycle figure in the normal state of the air conditioner changes depending on the outside air temperature. That is, the display shape of the normal information has a plurality of shapes depending on the outside air temperature.

In addition, the normal information acquiring unit 12 can calculate the refrigeration cycle (normal information) in the normal state of the air conditioner using the sensor data in the normal state detected by the pressure sensor and the temperature sensor. That is, the "acquisition" of the normal information by the normal information acquiring unit 12 includes calculating and acquiring the normal information using the measured data of the state value of the apparatus in addition to the case of reading and acquiring the normal information accumulated in a storage device.

The positional relationship acquiring unit 13 acquires a positional relationship of measured data in the display shape of the normal information. For example, when the display shape of the normal information is a polygon, the positional relationship acquiring unit 13 calculates a distance between a center point of the polygon and the measured data as the positional relationship of the measured data in the polygon, and calculates an angle formed by a straight line passing through the center point of the polygon and the measured data and a side of the polygon where the straight line intersects. The center point of the polygon is, for example, the center of gravity.

The "acquisition" of the positional relationship by the positional relationship acquiring unit 13 includes reading and acquiring the positional relationship data stored in the storage device in addition to calculating the positional relationship using the measured data and the normal information.

The projection unit 14 projects a plurality of pieces of measured data to a dimensionless space on the basis of a positional relationship between a plurality of display shapes of a plurality of pieces of normal information and the plurality of pieces of measured data. Here, the dimensionless space is a space in which a plurality of display shapes of a plurality of pieces of normal information are represented by a common shape, and points (dimensionless) represented using a positional relationship of measured data in the display shape of the normal information are plotted (projected).

The common shape is, for example, a circle having a radius of 1. The projection unit 14 applies the center point of the display shape of the plurality of pieces of normal information corresponding to the plurality of pieces of measured data to the center point of the circle, converts the positional relationship (distance information and angle information) between the center point of the display shape of the normal information and the measured data into the positional relationship with the center point of the circle, and thus plots the plurality of pieces of measured data in the dimensionless space including the circle. The measured data plotted in the dimensionless space is a point of a dimensionless value represented by a positional relationship with the display shape of the normal information. However, since the positions of the points in the dimensionless space are positions corresponding to the relationship between the display shape of the normal information and the measured data, the distribution of the points in the dimensionless space corresponds to the distribution of the states of the apparatus.

The distribution estimating unit 15 estimates the distribution of the states of the apparatus on the basis of the plurality of pieces of measured data projected to the dimensionless space. For example, the distribution estimating unit 15 estimates the distribution of the points in the dimensionless space, that is, the distribution of the state of the apparatus by applying the Gaussian Mixture Model Estimation processing to the plurality of points plotted in the dimensionless space. The method for estimating the distribution of the states of the apparatus may be any method capable of estimating the probability density distribution of the points in the dimensionless space, and for example, a maximum likelihood method, Bayesian estimation, or EM algorithm can be used.

The output unit 16 outputs data used for monitoring the state of the apparatus. Examples of the data used for monitoring the state of the apparatus include a dimensionless space in which a plurality of display shapes of a plurality of pieces of normal information are represented by a common shape, and a distribution of the states of the apparatus is set to the common shape. The output unit 16 causes the display device to display a dimensionless space, for example.

Next, the operation of the device 1 for monitoring state of apparatus will be described.

Figure 2:
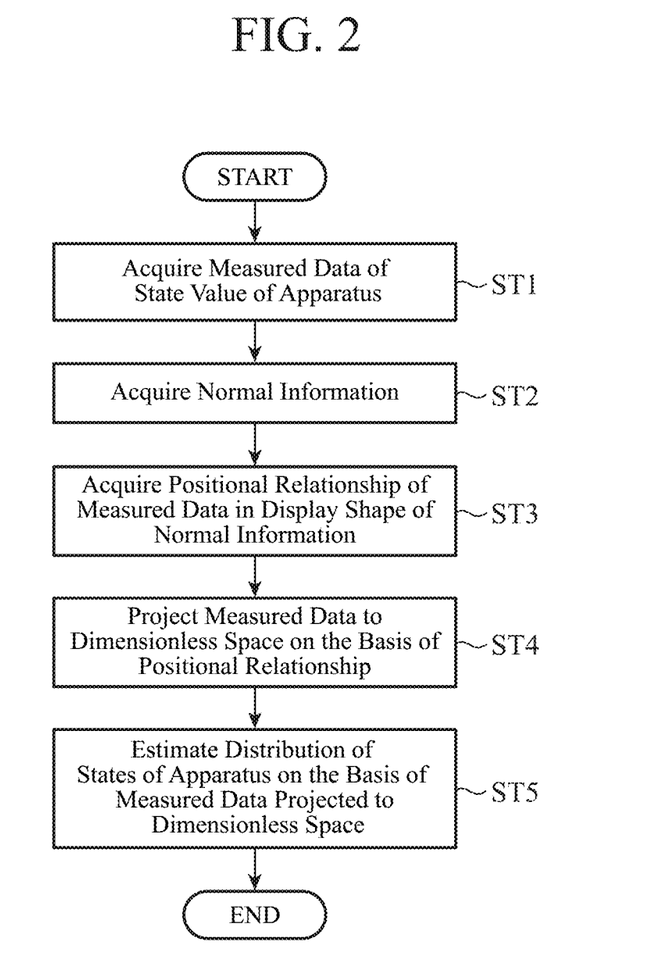
FIG. 2 is a flowchart showing a method for monitoring state of apparatus according to the first embodiment.

FIG. 2 is a flowchart showing a method for monitoring state of apparatus according to the first embodiment, and shows the operation of the device 1 for monitoring state of apparatus. First, the data acquiring unit 11 acquires measured data of the state value of the apparatus to be monitored (step ST1). For example, by continuously or periodically inputting sensor data (measured data) sequentially detected by a sensor installed in the apparatus, the data acquiring unit 11 acquires a time series of sensor data in a constant period (hereinafter, it is described as a monitoring period) for monitoring the apparatus, that is, time series data of a state value of the apparatus. Note that the measured data may be stored in a storage device, and the data acquiring unit 11 may acquire the measured data from the storage device.

Next, the normal information acquiring unit 12 acquires normal information on the state of the apparatus to be monitored (step ST2). For example, when the apparatus to be monitored is an air conditioner and the display shape of the normal information is the refrigeration cycle figure data on the p-h diagram in the normal state of the air conditioner, the normal information acquiring unit 12 calculates the refrigeration cycle figure data in the normal state using the sensor data in the normal state detected by the pressure sensor and the temperature sensor installed in the air conditioner. In addition, the refrigeration cycle figure data in the normal state corresponding to the outside air temperature may be stored in the storage device, and the normal information acquiring unit 12 may sequentially acquire the refrigeration cycle figure data corresponding to the outside air temperature in the monitoring period from the storage device.

Figure 3A:
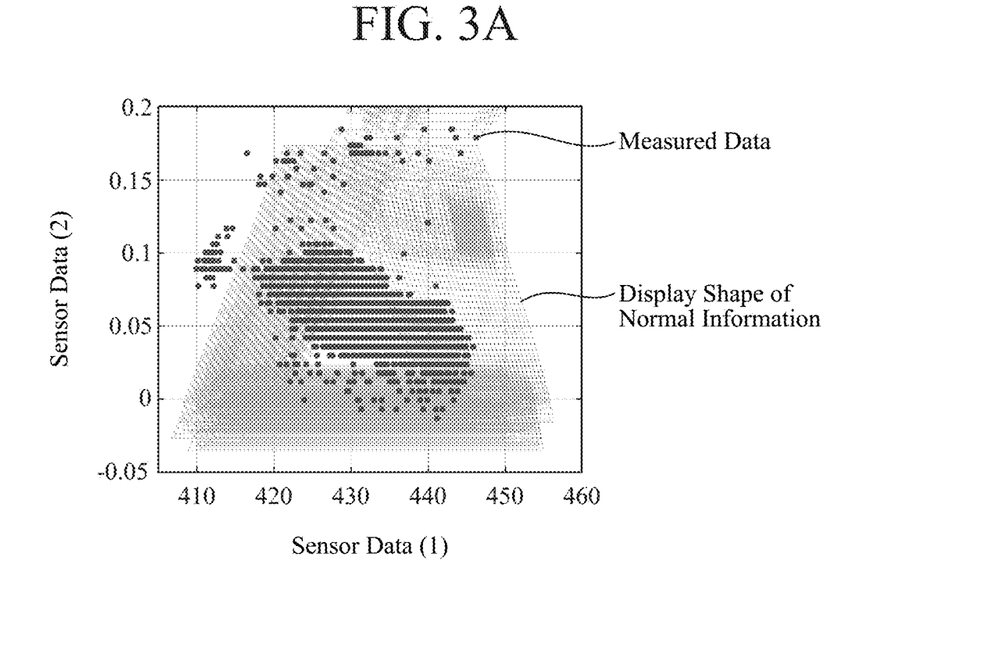
FIG. 3A is a diagram illustrating a relationship between a plurality of display shapes of a plurality of pieces of normal information and a plurality of pieces of measured data.

The positional relationship acquiring unit 13 acquires a positional relationship of measured data in the display shape of the normal information (step ST3). FIG. 3A is a diagram illustrating a relationship between a display shape of a plurality of pieces of normal information and the plurality of pieces of measured data, and is a graph illustrating a relationship between sensor data (2) and sensor data (1) detected by a sensor installed in an apparatus to be monitored. For example, the positional relationship acquiring unit 13 creates the graph illustrated in FIG. 3A using the measured data acquired by the data acquiring unit 11 and the normal information acquired by the normal information acquiring unit 12.

In the graph illustrated in FIG. 3A, the plurality of pieces of measured data including the sensor data (1) and the sensor data (2) are plotted, and shapes of a plurality of pieces of normal information corresponding to the respective pieces of measured data are displayed. As illustrated in FIG. 3A, even if the states specified from the sensor data (1) and the sensor data (2) are the same, the display shape of the normal information may vary depending on the external environment of the apparatus or the usage method. When the display shape of the normal information varies, as illustrated in FIG. 3A, the correspondence relationship between the measured data and the display shape of the normal information is complicated, so that the state of the apparatus cannot be accurately recognized.

Therefore, the device 1 for monitoring state of apparatus projects the plurality of pieces of measured data to a dimensionless space in which a plurality of display shapes of a plurality of pieces of normal information are represented by a common shape. As a result, the device 1 for monitoring state of apparatus can recognize a plurality of states of the apparatus on the basis of the common display shape. The positional relationship acquiring unit 13 acquires a positional relationship of the measured data in the display shape of the normal information as information for projecting the measured data to the dimensionless space. This positional relationship is, for example, distance information between the center point of the display shape of the normal information and the measured data, and angle information formed by a straight line passing through the center point of the display shape of the normal information and the measured data, and a side of the display shape of the normal information where the straight line intersects.

Figure 3B:
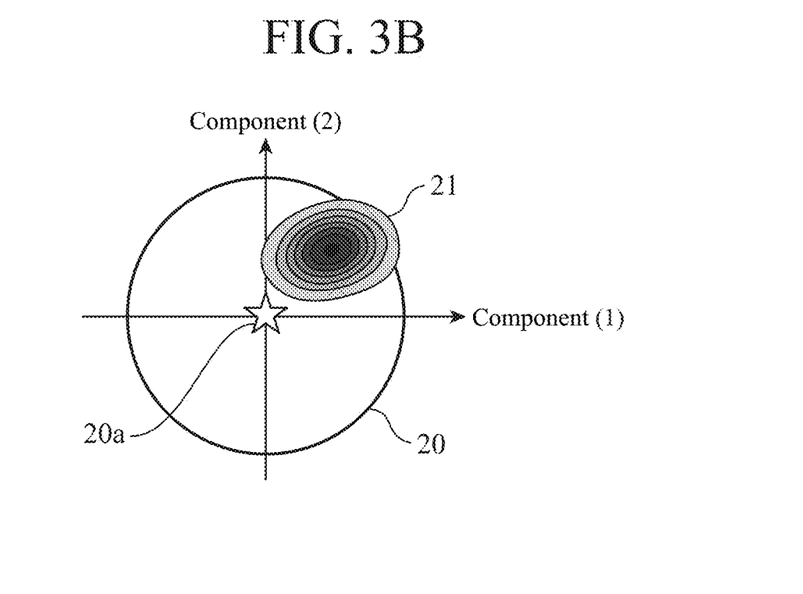
FIG. 3B is a diagram illustrating a dimensionless space in the first embodiment in which a plurality of pieces of measured data are projected.

The projection unit 14 projects the plurality of pieces of measured data to a dimensionless space on the basis of a positional relationship between a plurality of display shapes of a plurality of pieces of normal information and the plurality of pieces of measured data (step ST4). FIG. 3B is a diagram illustrating a dimensionless space in the first embodiment to which the plurality of pieces of measured data is projected. For example, as illustrated in FIG. 3B, the projection unit 14 applies the center point of the display shape of the plurality of pieces of normal information corresponding to the plurality of pieces of measured data to a center point 20a of the circle 20 in the dimensionless space, and converts the positional relationship between the center point of the display shape of the normal information and the measured data into the positional relationship with the center point 20a of the circle 20, thereby plotting the plurality of pieces of measured data in the circle 20.

The position of the point in the dimensionless space is a position corresponding to the relationship between the measured data before projection and the display shape of the normal information. Note that a component (1) illustrated in FIG. 3B is a component corresponding to the fluctuation of the sensor data (1), and a component (2) is a component corresponding to the fluctuation of the sensor data (2).

The distribution estimating unit 15 estimates the distribution of the states of the apparatus on the basis of the plurality of pieces of measured data projected to the dimensionless space (step ST5). For example, the distribution estimating unit 15 estimates a distribution 21 in the dimensionless space illustrated in FIG. 3B by performing the Gaussian mixture model estimation processing on a plurality of points plotted in the dimensionless space. In the distribution 21, the color or shade is determined depending on the number of points corresponding to the measured data, and the number of points corresponding to the measured data is the largest in a region where the color is the darkest and decreases as the color becomes lighter. The output unit 16 causes the display device to display the dimensionless space in which the distribution 21 is set.

Figure 4:
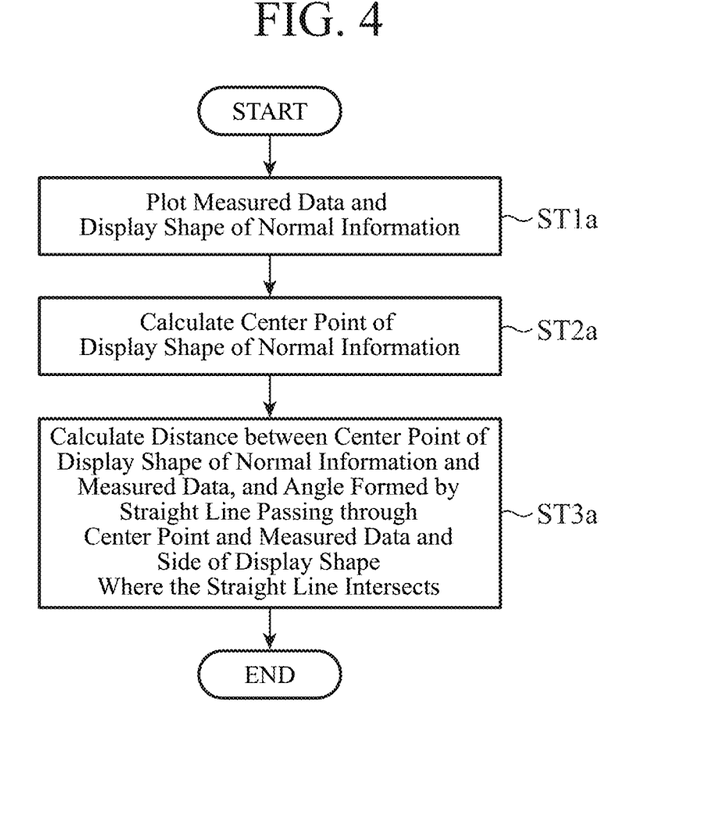
FIG. 4 is a flowchart illustrating positional relationship calculation processing in the first embodiment.
Figure 5:
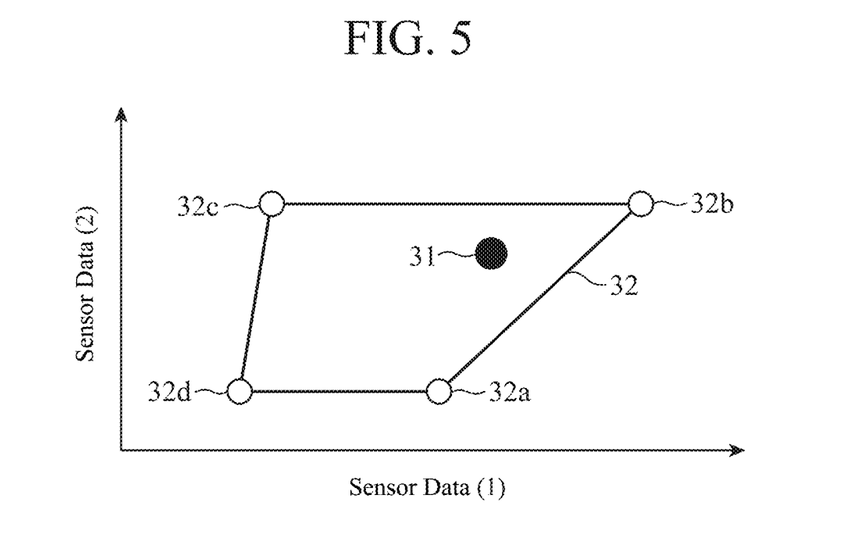
FIG. 5 is a diagram illustrating a display shape of normal information and measured data.

Next, the positional relationship calculation processing of the measured data in the normal information by the positional relationship acquiring unit 13 will be described in detail. FIG. 4 is a flowchart illustrating positional relationship calculation processing in the first embodiment, and illustrates details of processing in step ST3 in FIG. 2. The positional relationship acquiring unit 13 plots the measured data acquired by the data acquiring unit 11 on a two-dimensional coordinate plane and displays the shape of the normal information acquired by the normal information acquiring unit 12 on the two-dimensional coordinate plane (step ST1a). FIG. 5 is a diagram illustrating the display shape of the normal information and the measured data, and illustrates measured data 31 plotted on the two-dimensional coordinate plane on which the display shape 32 of the normal information is displayed.

In FIG. 5, the measured data 31 is measured data of a state value of an apparatus specified from sensor data (1) and sensor data (2) detected by a sensor installed in an apparatus to be monitored. The display shape 32 is normal information on the state indicated by the measured data 31, and has a quadrangular shape of vertexes 32a to 32d.

Figure 6:
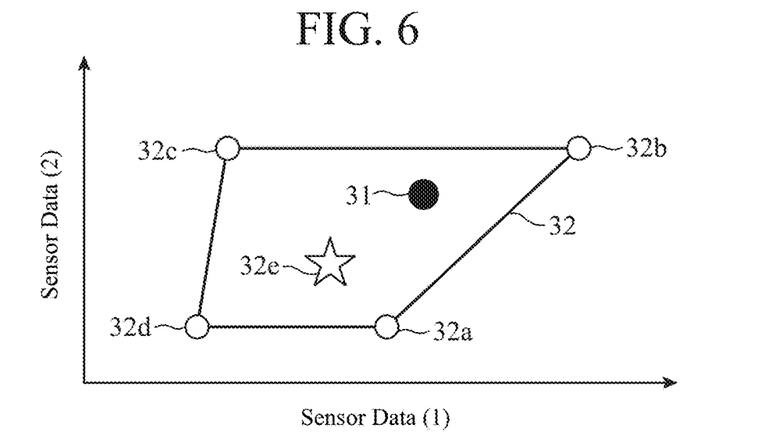
FIG. 6 is a diagram illustrating a display shape of normal information and measured data in FIG. 5, and a center point of the display shape of the normal information.

Next, the positional relationship acquiring unit 13 calculates a center point 32e of the display shape 32 (step ST2a). FIG. 6 is a diagram illustrating the display shape 32, the measured data 31, and the center point 32e of the display shape 32 in FIG. 5. For example, the positional relationship acquiring unit 13 calculates the center of gravity of the outer shape of the display shape 32 as the center point 32e. In FIG. 6, since the display shape 32 is a quadrangle, the positional relationship acquiring unit 13 calculates an intersection of a diagonal line connecting the vertex 32a and the vertex 32c and a diagonal line connecting the vertex 32b and the vertex 32d as the center point 32e.

Figure 7:
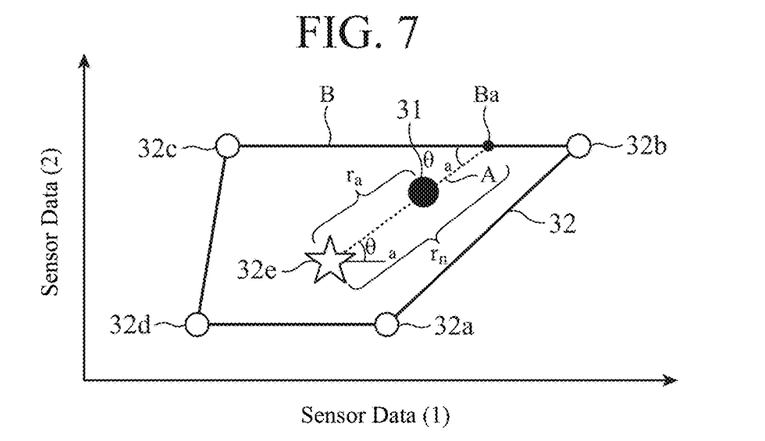
FIG. 7 is a diagram illustrating a positional relationship between a display shape of normal information and measured data in FIG. 5.

Subsequently, the positional relationship acquiring unit 13 calculates a distance $r_a$ between the center point 32e of the display shape 32 and the measured data 31, and an angle $\theta_a$ formed by a straight line A passing through the center point 32e of the display shape 32 and the measured data 31, and a side B on the outer shape of the display shape 32 where the straight line A intersects (step ST3a). FIG. 7 is a diagram illustrating a positional relationship between the display shape 32 of FIG. 5 and the measured data 31. For example, the positional relationship acquiring unit 13 calculates the straight line A passing through the measured data 31 and the center point 32e. Thereafter, the positional relationship acquiring unit 13 calculates the distance $r_a$ between the center point 32e and the measured data 31, and further calculates a distance $r_n$ from the center point 32e of the display shape 32 to an intersection point Ba of the straight line A and the side B on the outer shape of the display shape 32.

The positional relationship acquiring unit 13 calculates a relative ratio $r_R$ ($=r_a/r_n$) of the distance $r_a$ to the distance $r_n$ that is the length of the straight line A. Subsequently, the positional relationship acquiring unit 13 calculates an angle $\theta_a$ formed by the straight line A and the side B. The relative ratio $r_R$ and the angle $\theta_a$ calculated by the positional relationship acquiring unit 13 are output to the projection unit 14 as positional relationship data of the measured data 31 with respect to the center point 32e of the display shape 32.

Next, projection processing of measured data to a dimensionless space by the projection unit 14 will be described in detail.

Figure 8:
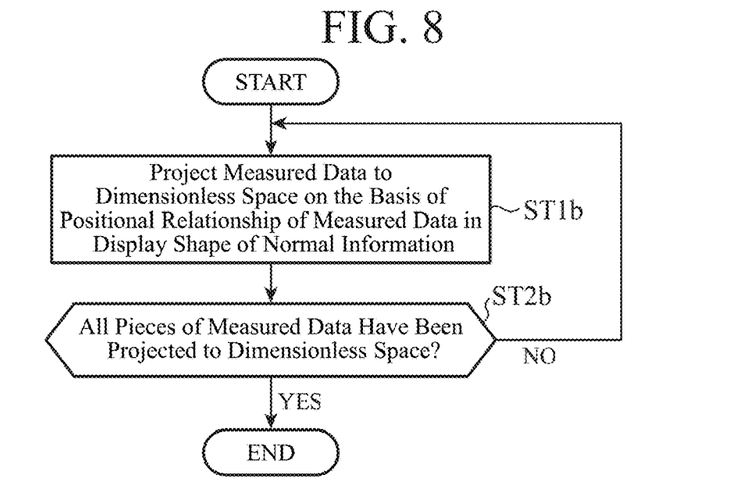
FIG. 8 is a flowchart illustrating projection processing of measured data to a dimensionless space in the first embodiment.
Figure 9:
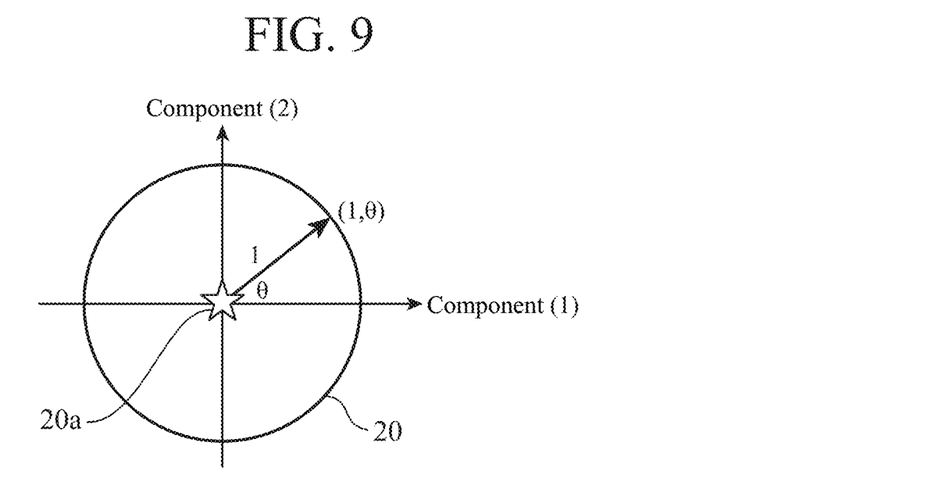
FIG. 9 is a diagram illustrating a dimensionless space in the first embodiment.

FIG. 8 is a flowchart illustrating projection processing of measured data to a dimensionless space in the first embodiment, and illustrates details of processing in step ST4 of FIG. 2. FIG. 9 is a diagram illustrating a dimensionless space in the first embodiment. Here, the dimensionless space is a space in which a circle 20 having a radius of 1 is set as illustrated in FIG. 9. When the angle of the component (1) from the axis is $\theta$, a point on the circle 20 is represented by (1, $\theta$). The component (1) is a component corresponding to the fluctuation of the sensor data (1) of FIG. 5, and the component (2) is a component corresponding to the fluctuation of the sensor data (2) of FIG. 5.

Figure 10:
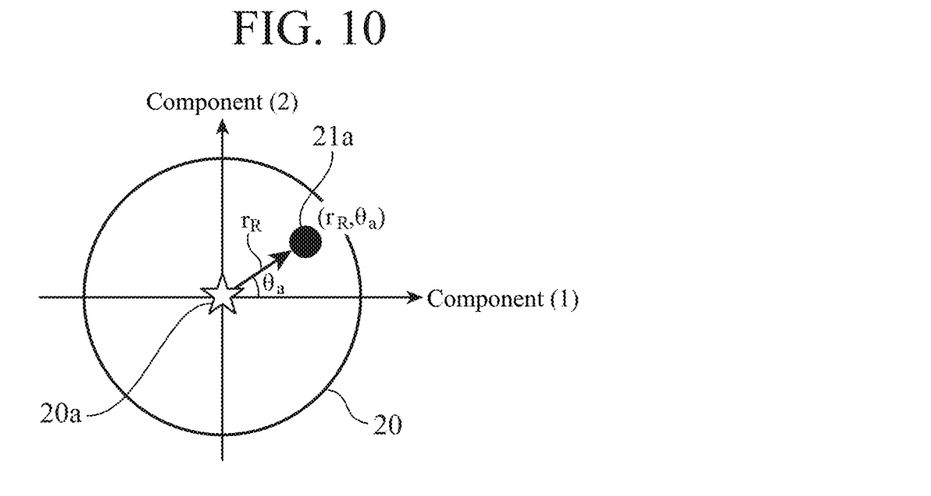
FIG. 10 is a diagram illustrating a dimensionless space of FIG. 9 and measured data projected to the dimensionless space.

The projection unit 14 projects the measured data 31 to the dimensionless space on the basis of the positional relationship of the measured data 31 in the display shape 32 (step ST1b). FIG. 10 is a diagram illustrating a dimensionless space of FIG. 9 and measured data 21a projected to the dimensionless space. For example, the projection unit 14 applies the center point 32e of the display shape 32 illustrated in FIG. 7 to the center point 20a of the circle 20 in the dimensionless space illustrated in FIG. 9. Next, the projection unit 14 replaces the distance $r_n$ with the radius of the circle 20, and plots the measured data 31 to a dimensionless space using the relative ratio $r_R$ of the distance from the center point 32e of the display shape 32 to the measured data 31 and the angle $\theta_a$ formed by the straight line A passing through the measured data 31 and the side B of the display shape 32. As a result, the measured data 31 is converted into the point ($r_R$, $\theta_a$) and plotted in a dimensionless space.

Thereafter, the projection unit 14 confirms whether or not all pieces of the measured data 31 of which the positional relationship with the display shape 32 has been acquired have been projected to the dimensionless space (step ST2b). Here, in a case where there is measured data 31 that has not been projected to the dimensionless space (step ST2b; NO), returning to step ST1b, the center points 32e of the plurality of display shapes 32 are sequentially applied to the center point 20a of the circle 20, and the projection processing of the measured data 31 to the dimensionless space is executed. On the other hand, if there is no measured data 31 that has not been projected to the dimensionless space (step ST2b; YES), the processing of FIG. 8 ends.

The distribution estimating unit 15 estimates the distribution 21 in the dimensionless space as illustrated in FIG. 3B by applying the Gaussian mixture model estimation processing to a plurality of points plotted in the dimensionless space by the projection unit 14. Here, a state determination for apparatus using the distribution estimated by the distribution estimating unit 15 will be described.

Figure 11A:
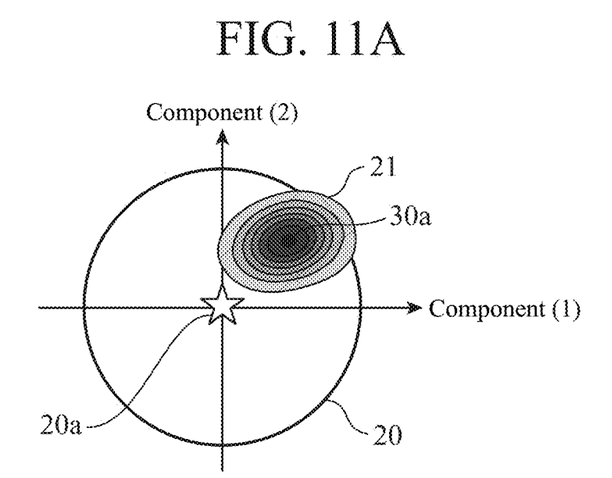
FIG. 11A is a diagram illustrating an outline of a state determination for apparatus using a distribution of measured data projected to a dimensionless space in the first embodiment.

FIG. 11A is a diagram illustrating an outline of a state determination for apparatus using the distribution 21 of measured data projected to a dimensionless space. In the distribution 21, the color or shade is determined depending on the number of points corresponding to the measured data, and the number of points corresponding to the measured data is the largest in a region 30a having the darkest color and decreases as the color becomes lighter.

In FIG. 11A, the component (1) is a component corresponding to the fluctuation of the sensor data (1), and the component (2) is a component corresponding to the fluctuation of the sensor data (2). In addition, the region 30a has the largest number of points corresponding to the measured data in the distribution 21, and has a dominant influence on the characteristic of the distribution 21. A circle 20 corresponds to a normal state of the apparatus indicated by the measured data including the sensor data (1) and the sensor data (2).

The distribution estimating unit 15 can determine whether or not the state of the apparatus to be monitored is close to a normal state on the basis of the positional relationship between the region 30a of the distribution 21 and the circle 20. In the distribution 21 illustrated in FIG. 11A, since the region 30a is present at a position away from the circle 20, the state of the apparatus is deviated from the normal state, that is, the state of the apparatus is deteriorated. As described above, in the device 1 for monitoring state of apparatus, since the change tendency of the state of the apparatus in the monitoring period can be specified, even if an outlier incidentally occurs in the measured data, its influence is reduced.

Figure 11B:
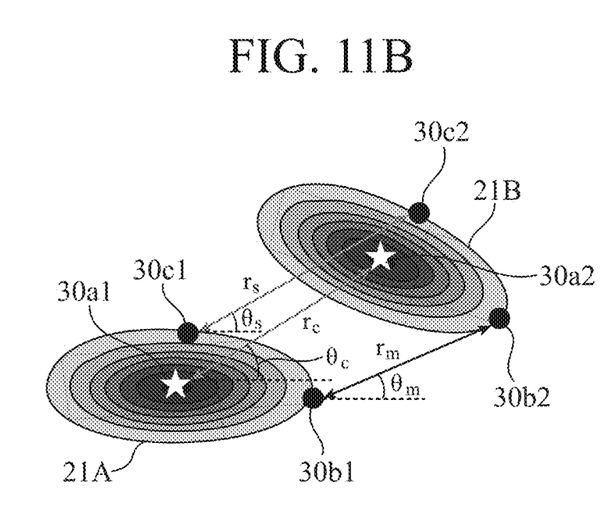
FIG. 11B is a diagram illustrating an outline of a state degradation determination for apparatus using a distribution of measured data projected to a dimensionless space in the first embodiment.

FIG. 11B is a diagram illustrating an outline of a state degradation determination for apparatus using distributions 21A and 21B of the measured data projected to the dimensionless space. In FIG. 11B, the distribution 21A is a distribution of the state of the apparatus estimated by the distribution estimating unit 15, and is estimated on the basis of the measured data acquired in a monitoring period (1). The distribution 21B is a distribution in the same state as the distribution 21A, but is a distribution estimated on the basis of measured data acquired in a monitoring period (2) in which time has elapsed from the monitoring period (1). Further, the outer shapes of the distribution 21A and the distribution 21B are elliptical.

The state of the apparatus to be monitored changes over time, and the distribution 21A transitions to the distribution 21B. At this time, the transition from a center point 30a1 of the distribution 21A to a center point 30a2 of the distribution 21B can be represented by $(r_c, \theta_c)$. The distance $r_c$ is a distance between the center point 30a1 and the center point 30a2, and the angle $\theta_c$ is an angle formed by a line segment connecting the center point 30a1 and the center point 30a2 at the center point 30a1. Similarly, the transition from a point 30b1 on the major axis of the distribution 21A to a point 30b2 on the major axis of the distribution 21B can be represented by $(r_m, \theta_m)$, and the transition from a point 30c1 on the minor axis of the distribution 21A to a point 30c2 on the minor axis of the distribution 21B can be represented by $(r_s, \theta_s)$.

The distribution estimating unit 15 can specify the positional relationship between the distribution of the measured data projected to the dimensionless space and, for example, the circle 20 illustrated in FIG. 11A on the basis of the $(r, \theta)$ indicating the transition of the distribution of the measured data projected to the dimensionless space, and determine whether or not the state of the apparatus to be monitored has deteriorated on the basis of the specified positional relationship. In this manner, by quantifying the temporal transition of the distribution estimated by the distribution estimating unit 15, it is possible to accurately determine the state degradation of the apparatus to be monitored.

Hitherto, the case where the common shape in which the display shapes of the plurality of pieces of normal information are unified in the dimensionless space is the circle has been described, but the shape is not limited to the circle, and may be a polygon.

Subsequently, a hardware configuration for implementing the functions of the device 1 for monitoring state of apparatus according to the first embodiment will be described. The functions of the data acquiring unit 11, the normal information acquiring unit 12, the positional relationship acquiring unit 13, the projection unit 14, the distribution estimating unit 15, and the output unit 16 in the device 1 for monitoring state of apparatus are implemented by a processing circuit. That is, the device 1 for monitoring state of apparatus includes a processing circuit for executing the processing from step ST1 to step ST5 in FIG. 2. The processing circuit may be dedicated hardware or a central processing unit (CPU) that executes a program stored in a memory.

Figure 12A:
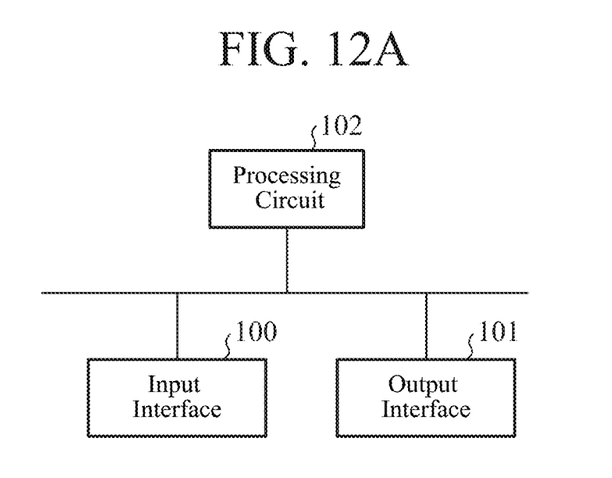
FIG. 12A is a block diagram illustrating a hardware configuration for implementing functions of a device for monitoring state of apparatus according to the first embodiment.
Figure 12B:
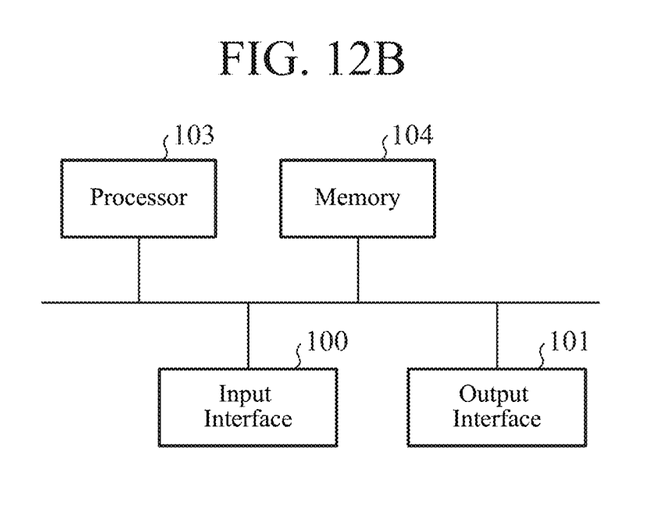
FIG. 12B is a block diagram illustrating a hardware configuration for executing software for implementing the functions of the device for monitoring state of apparatus according to the first embodiment.

FIG. 12A is a block diagram showing a hardware configuration for implementing the functions of the device 1 for monitoring state of apparatus. FIG. 12B is a block diagram showing a hardware configuration for executing software that implements the functions of the device 1 for monitoring state of apparatus. In FIGS. 12A and 12B, an input interface 100 is an interface that relays sensor data output from a sensor installed in an apparatus to be monitored to the device 1 for monitoring state of apparatus. Further, an output interface 101 is an interface that relays information output from the device 1 for monitoring state of apparatus.

When the processing circuit is a processing circuit 102 of dedicated hardware shown in FIG. 12A, the processing circuit 102 corresponds, for example, to a single circuit, a composite circuit, a programmed processor, a parallel-programmed processor, an application specific integrated circuit (ASIC), a field-programmable gate array (FPGA), or a combination thereof. The functions of the data acquiring unit 11, the normal information acquiring unit 12, the positional relationship acquiring unit 13, the projection unit 14, the distribution estimating unit 15, and the output unit 16 in the device 1 for monitoring state of apparatus may be implemented by separate processing circuits, or these functions may be collectively implemented by one processing circuit.

In a case where the processing circuit is a processor 103 illustrated in FIG. 12B, the functions of the data acquiring unit 11, the normal information acquiring unit 12, the positional relationship acquiring unit 13, the projection unit 14, the distribution estimating unit 15, and the output unit 16 in the device 1 for monitoring state of apparatus are implemented by software, firmware, or a combination of software and firmware. Note that, software or firmware is written as a program and stored in a memory 104.

The processor 103 reads and executes the program stored in the memory 104, thereby implementing the functions of the data acquiring unit 11, the normal information acquiring unit 12, the positional relationship acquiring unit 13, the projection unit 14, the distribution estimating unit 15, and the output unit 16 in the device 1 for monitoring state of apparatus. For example, the device 1 for monitoring state of apparatus includes the memory 104 for storing programs in which the processing from step ST1 to step ST5 in the flowchart shown in FIG. 2 are executed as a result when executed by the processor 103. These programs cause a computer to execute procedures or methods performed by the data acquiring unit 11, the normal information acquiring unit 12, the positional relationship acquiring unit 13, the projection unit 14, the distribution estimating unit 15, and the output unit 16. The memory 104 may be a computer-readable storage medium storing a program for causing a computer to function as the data acquiring unit 11, the normal information acquiring unit 12, the positional relationship acquiring unit 13, the projection unit 14, the distribution estimating unit 15, and the output unit 16.

Examples of the memory 104 correspond to a nonvolatile or volatile semiconductor memory, such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, and a DVD.

A part of the functions of the data acquiring unit 11, the normal information acquiring unit 12, the positional relationship acquiring unit 13, the projection unit 14, the distribution estimating unit 15, and the output unit 16 in the device 1 for monitoring state of apparatus may be implemented by dedicated hardware, and a part thereof may be implemented by software or firmware. For example, the functions of the data acquiring unit 11, the normal information acquiring unit 12, and the positional relationship acquiring unit 13 are implemented by the processing circuit 102, which is dedicated hardware, and the functions of the projection unit 14, the distribution estimating unit 15, and the output unit 16 are implemented by the processor 103 reading and executing the programs stored in the memory 104. Thus, the processing circuit can implement the above functions by hardware, software, firmware, or a combination thereof.

As described above, the device 1 for monitoring state of apparatus according to the first embodiment includes the data acquiring unit 11 for acquiring the measured data of the state value of the apparatus, the normal information acquiring unit 12 for acquiring the normal information indicating the normal state of the apparatus, the positional relationship acquiring unit 13 for acquiring the positional relationship of the measured data in the display shape of the normal information, the projection unit 14 for projecting the plurality of pieces of measured data to the dimensionless space in which the plurality of display shapes of the plurality of pieces of normal information are represented by the common shape on the basis of the positional relationship between the plurality of display shapes of the plurality of pieces of normal information and the plurality of pieces of measured data, and the distribution estimating unit 15 for estimating the distribution of the state of the apparatus on the basis of the plurality of pieces of measured data projected to the dimensionless space. As a result, a plurality of states of the apparatus can be recognized on the basis of the common display shape.

Note that, the present invention is not limited to the above-described embodiments, and within the scope of the present invention, it is possible to modify any component of the embodiments or omit any component of the embodiments.

INDUSTRIAL APPLICABILITY

The device for monitoring state of apparatus according to the present invention can be used, for example, for monitoring state of operation of an air conditioner.

REFERENCE SIGNS LIST

1: device for monitoring state of apparatus,
11: data acquiring unit,
12: normal information acquiring unit,
13: positional relationship acquiring unit,
14: projection unit,
15: distribution estimating unit,
16: output unit,
20: circle,
20a, 30a1, 30a2, 32e : center point,
21, 21A, 21B: distribution,
21a: measured data,
30a: region,
31: measured data,
32: display shape,
32a to 32d: vertex,
100: input interface,
101: output interface,
102: processing circuit,
103: processor,
104: memory

What is claimed is:

1. A device for monitoring state of an air conditioner, comprising:
processing circuitry
to acquire measured data of a state value of the air conditioner, wherein the measured data are sensor data detected by pressure sensors and temperature sensors installed at various locations of the air conditioner;
to acquire normal information indicating a normal state of the air conditioner, wherein the normal information are a refrigeration cycle of a pressure-specific enthalpy, p-h, diagram in the normal state of the air conditioner;
to acquire a positional relationship of the measured data in a display shape of the normal information;
to project a plurality of pieces of the measured data to a dimensionless space, in which a plurality of display shapes of a plurality of pieces of the normal information are represented by a common shape, by converting the plurality of pieces of the measured data to points that are plotted in the dimensionless space based on a positional relationship between the plurality of display shapes of the plurality of pieces of the normal information and the plurality of pieces of the measured data; and
to estimate a distribution of the state of the air conditioner based on the plurality of pieces of the measured data plotted in the dimensionless space,
wherein the processing circuitry is further configured to determine that the state of the air conditioner is deviated from the normal state, if a region, which has the largest number of points that correspond to the projected measured data, is present at a position away from the common shape.

2. A device for monitoring state of an air conditioner, comprising:
processing circuitry to output data used to monitor the state of the air conditioner,
the processing circuitry outputs a dimensionless space data in which a plurality of display shapes of a plurality of pieces of normal information indicating a normal state of the air conditioner are represented by a common shape, and a distribution of states of the air conditioner is set for the common shape,
the processing circuitry acquires measured data of a state value of the air conditioner, wherein the measured data are sensor data detected by pressure sensors and temperature sensors installed at various locations of the air conditioner;

acquires the normal information, wherein the normal information are a refrigeration cycle of a pressure-specific enthalpy, p-h, diagram in the normal state of the air conditioner;

acquires a positional relationship of the measured data in a display shape of the normal information;

project a plurality of pieces of the measured data to the dimensionless space by converting the plurality of pieces of the measured data to points that are plotted in the dimensionless space based on a positional relationship between a plurality of display shapes of a plurality of pieces of the normal information and the plurality of pieces of the measured data; and estimates a distribution of the states of the air conditioner based on a plurality of pieces of the measured data plotted in the dimensionless space, wherein the processing circuitry is further configured to determine that the state of the air conditioner is deviated from the normal state, if a region, which has the largest number of points that correspond to the projected measured data, is present at a position away from the common shape.

3. The device for monitoring state of the air conditioner according to claim 1, wherein the processing circuitry calculates, as a positional relationship of the measured data in the display shape of the normal information, a distance between a center point of the display shape of the normal information and the measured data, and an angle formed by a straight line passing through the center point and the measured data and a side of the display shape of the normal information where the straight line intersects.

4. The device for monitoring state of the air conditioner according to claim 2, wherein the processing circuitry calculates, as a positional relationship of the measured data in the display shape of the normal information, a distance between a center point of the display shape of the normal information and the measured data, and an angle formed by a straight line passing through the center point and the measured data and a side of the display shape of the normal information where the straight line intersects.

5. A method for monitoring state of an air conditioner, comprising:

acquiring measured data of a state value of the air conditioner, wherein the measured data are sensor data detected by pressure sensors and temperature sensors installed at various locations of the air conditioner;

acquiring normal information indicating a normal state of the air conditioner, wherein the normal information are a refrigeration cycle of a pressure-specific enthalpy, p-h, diagram in the normal state of the air conditioner;

acquiring a positional relationship of the measured data in a display shape of the normal information;

projecting a plurality of pieces of the measured data to a dimensionless space, in which a plurality of display shapes of a plurality of pieces of the normal information are represented by a common shape, by converting the plurality of pieces of the measured data to points that are plotted in the dimensionless space based on a positional relationship between a plurality of display shapes of a plurality of pieces of the normal information and a plurality of pieces of the measured data;

estimating a distribution of the state of the air conditioner based on a plurality of pieces of the measured data plotted in the dimensionless space; and determining that the state of the air conditioner is deviated from the normal state, if a region, which has the largest number of points that correspond to the projected measured data, is present at a position away from the common shape.

* * * * *